United States Patent [19]
Kruger

[11] 4,037,348
[45] July 26, 1977

[54] FISH LURE

[76] Inventor: Joachim Kruger, Schillerstrasse 8, D-49 Herford, Germany

[21] Appl. No.: 666,436

[22] Filed: Mar. 12, 1976

[30] Foreign Application Priority Data

Mar. 15, 1975   Germany .............................. 2511414

[51] Int. Cl.² ............................................. A01K 85/00
[52] U.S. Cl. .................................. 43/42.23; 43/42.49; 43/43.13
[58] Field of Search ................. 43/42.49, 43.13, 42.23, 43/42.22, 42.39

[56] References Cited
U.S. PATENT DOCUMENTS

| 1,361,067 | 12/1920 | Jordan ................................. 43/42.22 |
| 2,412,399 | 12/1946 | Henricks ............................. 43/43.13 |
| 2,893,154 | 7/1959 | McKee ..................................... 43/3 |

FOREIGN PATENT DOCUMENTS

| 37,076 | 9/1968 | Finland ............................... 43/42.49 |
| 2,219,471 | 11/1973 | Germany ............................ 43/42.22 |

Primary Examiner—Warner H. Camp
Attorney, Agent, or Firm—Toren, McGeady and Stanger

[57] ABSTRACT

An imitation fish lure for use with a rod and line for catching predatory fish comprises a wing shaped swimming body so curved as to imitate a fish swimming transversely to the line when pulled by the line and a bar parallel to the longitudinal axis of the swimming body for slidable attachment of the line, the bar being adjustable at right angles to the longitudinal axis of the swimming body.

4 Claims, 6 Drawing Figures

FISH LURE

BACKGROUND OF THE INVENTION

The invention relates to imitation of a fish as a lure for catching predatory fish of prey with a fishing rod and line, such as is shown for example in German Offenlegungsschrift No. 2,219,471. This device comprises wing shaped swimming body which is slightly curved symmetrically about a transverse median line and of a material lighter than water. It has an outwardly curved surface with two gliding surfaces at an obtuse angle to one another when seen in a cross-section of the swimming body. Said curved surface bears a bar, parallel to the longitudinal axis of the swimming body, to which the fishing line is slidably attached, in order to produce swimming movements of the imitation lure between end positions. These movements reciprocate at right-angles to the direction of pull of the swimming body along an edge running towards the outer ends of the outwardly curved surface of the swimming body.

With the previously mentioned imitation fish lure, fishing can take place for as long as possible and as large an area of water as possible may be fished after casting with the fishing rod, in order to encompass the scattered positions of the predatory fish particularly well. The previously known imitation fish lures are not suitable for this, because they only allow the fishing lure to be brought in in a straight line after casting. It was only possible for them to drift laterally parallel to the direction of travel of a moving boat in accordance with a direction which was set beforehand by means of devices connected to them. In this manner larger areas of water could only be fished if the fishing lure was cast several times or if several operations with a boat took place side by side. This repeated casting or the operations with the boat unsettle the water, however and thus disturb the fish and adversely affect the result of the catch.

In contrast, the imitation fish lure according to German Offenlegungsschrift No. 2,219,471 shows significantly more favourable properties. In still waters it is possible to fish a larger area of water evenly at each casting, to keep the imitation fish lure in the water over a longer period of time, to guide it safely to particular locations of the predatory fish and to imitate a fish-like swimming motion. In flowing waters the imitation fish lure may even be kept in the water over an unlimited period of time and in addition may pass particular places as often as desired. These advantages are achieved by the fact that the imitation fish lure shaped for lateral drift in both directions is moved on by the pull of the fishing line or by the pull of the line to counteract the pressure of the flow of water at right-angles to the direction of pull or pressure, it performs turns according to commands with the fishing rod and afterwards continues its swimming movement in the opposite direction.

The backward and forward swimming movements of the imitation fish lure are however often insufficient to make a predatory fish bite because of their uniformity. The result of the catch to be achieved would be significantly better if the imitation fish lure were to simulate the irregular swimming movements of naturally ill fish.

SUMMARY OF THE INVENTION

It is an object of the invention to form the swimming movements of the imitation fish lure such that movements, which are directed backwards and forwards and are connected with tilting around the longitudinal axis, are carried out in the alternating directions of swimming, and these movements are repeated in faster or slower sequence depending on the pulling force of the fishing line.

According to the invention, there is provided an imitation fish lure for use with a rod and line for catching predatory fish comprising a wing shaped swimming body curved symmetrically about a transverse median line to immitate a fish swimming transversely to said line when pulled thereby, a bar parallel to a longitudinal axis of said swimming body for slidable attachment of the line and adjusting means for adjusting said bar in a direction at right angles to said longitudinal axis.

BRIEF DESCRIPTION OF THE DRAWINGS

The invention will now be described in greater detail, by way of example, with reference to the drawings, in which.

DESCRIPTION OF THE PREFERRED EMBODIMENT

In a preferred embodiment of the invention, a imitation fish lure of the type designated at the outset is proposed which is chiefly distinguished by the fact that the bar acting to fasten the swimming body to the fishing lure is arranged on the swimming body below and parallel to the longitudinal axis thereof in such a way that is adjustable in height relative to the swimming body.

Furthermore, it is particularly advantageous if the bar is located on a member which is let into a lower gliding plane of the swimming body which is outwardly curved, said member being made of a material heavier than water.

It is possible with these features of the invention to alter, as desired, the point of attachment of the fishing line to the swimming body and the conditions of balance between the members bestowing the imitation fish lure with its buoyancy and those pulling it downwards, so that fundamentally wave-shaped or even straight backward and forward swimming movements are performed by the imitation fish lure in conjunction with its shape, optionally by means of the pull of the fishing line or by means of the back pressure of the water. Thus it is possible to simulate the different types of swimming behaviour of natural fish in a manner which is true to nature and in this way to entice the predatory fish to bite.

In a further advisable refinement of the imitation fish lure in accordance with the invention, the member equipped with the bar should be constructed as a metal plate guided on the swimming body and displaceable by means of a longitudinal aperture and a locking screw. Such a displaceable metal plate is not only very easily manipulated, in order to carry out exactly the desired changes in the centre of gravity of the relatively small swimming body, but it also offers the possibility of changing the size of its lower curved gliding plane influence the swimming attitude. In order to influence the position of the centre of gravity it may, moreover, be of importance to suspend fish hooks from the displaceable member bearing the bar, because they would additionally weight this member.

Particularly good swimming properties may moreover be bestowed on the imitation fish lure in accordance with the invention by the edge running on the outwardly curved surface of the swimming body and overhanging the bar serving to fasten the fishing line extending on both sides up to the ends of the swimming body. Thus a stabilizing edge taking up the entire length of the swimming body is produced in this way.

Figure 1:
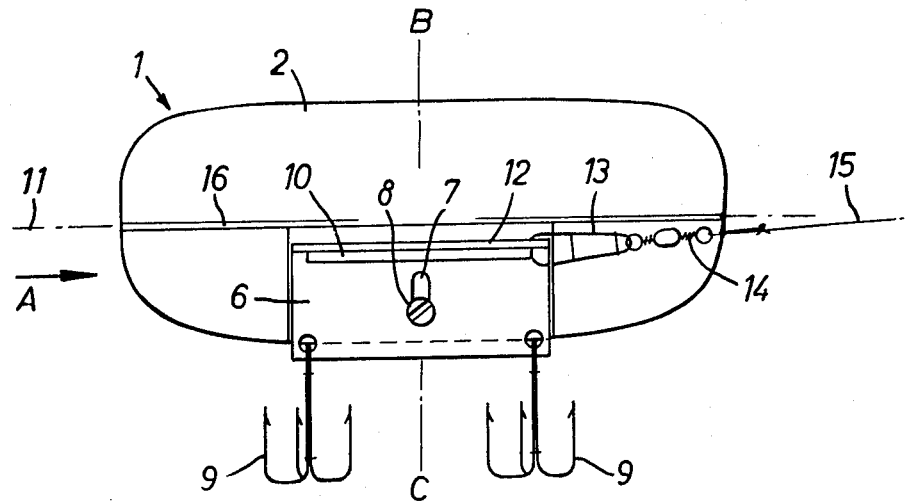
FIG. 1, is a view facing the angler of an imitation fish lure in accordance with the invention for catching predatory fish.
Figure 2:
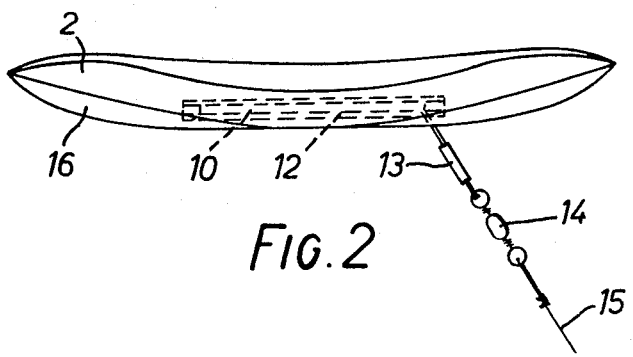
FIG. 2, is the plan view of the imitation fish lure of FIG. 1.
Figure 3:
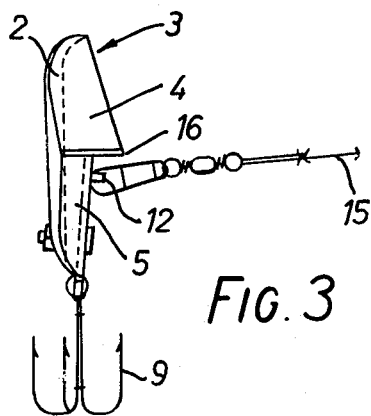
FIG. 3 is a side view of the imitation fish lure taken in the direction of the arrow A in FIG. 1.
Figure 4:
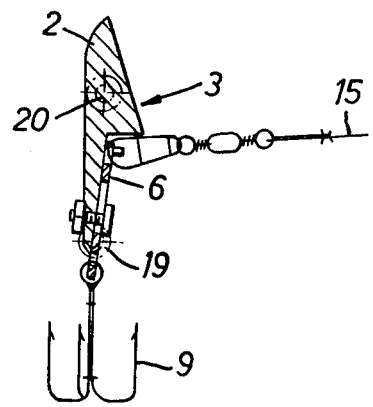
FIG. 4, is a cross section of the imitation fish lure taken on the line B–C of FIG. 1.
Figure 5:
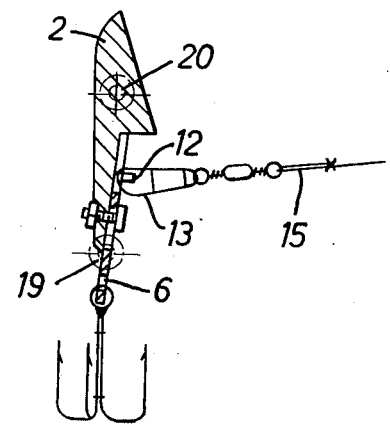
FIG. 5, is a view similar to FIG. 4, but showing a different adjustment of the lure

Referring now to the drawings the imitation fish lure 1 shown comprises a wing-shaped swimming body 2, which is slightly curved along its length symmetrically with respect to its transverse median line and is made of a material lighter than water. As shown in FIGS. 3 to 5 it has an outwardly curved surface 3 comprising two gliding planes 4 and 5 arranged at an obtuse angle to one another when considered in the cross-section of the swimming body 2.

A member constructed as a metal plate 6 and of a metal which is heavier than water is let into the lower outwardly curved gliding plane 5 of the swimming body 2, said member being adjustable in height on the swimming body 2 by means of a longitudinal aperture 7 and a locking screw 8. Two fish hooks 9 are suspended from the lower edge of the plate 6, while its upper edge is provided with a slit 10 and in this manner forms a bar 12 which extends over the entire length of the metal plate 6 and parallel to the longitudinal axis 11 of the swimming body 2. A spring safety hook 13 engages around the bar 12 and may slide backwards and forwards freely between the two ends of the slit 10. A fishing line 15 is fastened to the hook 13 via a swivel 14.

In the region of the longitudinal axis 11 of the swimming body 2 there is an edge 16 overhanging the bar 12 on the metal plate 6 and which makes an edge for the outwardly curved surface 3 of the swimming body 2, said edge 16 at the same time forming the lower edge of the upper curved gliding plane 4. First and foremost the edge 16 should protect the fastening of the fishing line 15 on the swimming body 2 from the teeth of the predatory fish biting at the imitation fish lure 1. Since, moreover, the edge 16 follows the outwardly curved surface 3 of the swimming body 2 on both sides up to its ends, at the same time it represents a stabilizing edge influencing its swimming movements.

Figure 6:
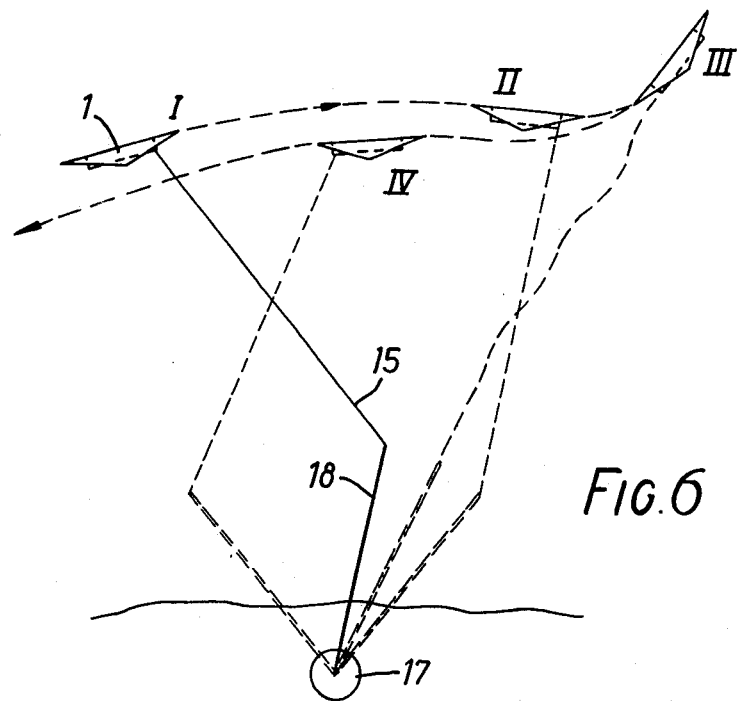
FIG. 6 is a schematic view of the mode of operation of the imitation fish lure when fishing in still waters.

The mode of operation of the imitation fish lure 1 in accordance with the invention in still waters may be seen from FIG. 6. From a standpoint 17 the imitation fish lure 1 is cast with a fishing rod 18 and the affixed fishing line 15 is made taut. Here it is assumed that the spring safety hook 13 located on the end of the fishing line 15 is located in its right-hand end position on the bar 12 of the metal plate 6. If the fishing line 15 now pulled still further, then the imitation fish lure 1 carries out a swimming movement which is directed towards the right from its position I because of its curved shape and the back pressure of the water. When it has reached position II, the fishing line 15 is left loose by lowering the tip of the fishing rod 18, whereupon the imitation fish lure 1 swims on to the turning point III as a result of its inertia mass. When it has reached the latter, at the latest, the spring safety hook 13 of the fishing line 15 on the bar 12 of the metal plate 6 is moved to its left-hand end position and by retightening of the fishing line 15. When the fishing line 15 is again pulled, the imitation fish lure 1 moves to the position IV and from there continues its path in this swimming direction, if the fishing line 15 is continuously pulled. In order to change its direction of swimming back into its original direction, this can be achieved in the manner just described after a renewed loosening of the fishing line 15.

It is possible with the above illustrated turning manoeuvres of the imitaton fish lure 1, to fish an extensive area of water in still waters during a single casting of the fishing line 15 during a relatively long-lasting fishing operation and to guide the imitation fish lure 1 as exactly as possible to particular places in the water. Furthermore, in flowing water only one cast is necessary to be able to fish for a long time, possibly even from the opposite bank, because here the force moving the swimming body 2 onwards is not the pull of the fishing line 15, but the pull provided by the line is counteracting the constant pressure of the flow of water. In this manner, the imitation fish lure 1 is moved backwards and forwards constantly between two turning points on the same gliding plane if the length of the fishing line 15 is not changed and constant movements are carried out with the fishing rod 18.

In order that the imitation fish lure 1 may change its height position in the water during the turning manoeuvres evident from FIG. 6 and thus will not show any constant swimming attitude, the changes in the imitation fish lure 1 which are shown in FIGS. 4 and 5 may be carried out. These consist of the optional setting of the metal plate 6 on the swimming body 2, which is shown in its uppermost position in FIG. 4 and its lowermost position in FIG. 5. As a result of the displaceability of the metal plate 6, the position of the centre of gravity 19 of the members heavier than water which draw the swimming body downwards may be changed and with it, the distance of the swimming body from the centre of gravity with the parts 20 providing the swimming body 2 with buoyancy. At the same time, the fixing of the fishing line 15 on to the swimming body 2 may be brought to varying height positions by displacing the metal plate 6.

If the metal plate 6 is located as in FIG. 4 in its uppermost position on the floating body 2 then the imitation fish lure 1 has a low stability because of the small distance between the centre 19 of the forces pulling it downwards and the centre 20 of the forces providing it with buoyancy. By pulling the fishing line 15 therefore it is provided with a downward direction of swimming under the back pressure of the water, until this is reversed, because of the pulling force of the fishing line 15, into an upward swimming direction. After reaching the previous height position in the water the swimming body 2 again inclines downwards so that by repeating these processes a wave form swimming movement of the imitation fish lure 1 is effected, which may be controlled moreover by raising or lowering the tip of the fishing rod.

If the metal plate 6 takes up its lowest position on the floating body 2, according to FIG. 5, then the distance between the centres 19 and 20 and the lower curved gliding plane 5 is increased by the metal plate 6 which now extends beyond it. The greater stability of the imitation fish lure 1 thus brought about leads to it now carrying out straight line swimming movements in contrast to the position of the metal plate 6 in FIG. 4. Between these two end positions, there are still a plurality of further possibilities for bringing about different swimming movements of the imitation fish lure 1 and of imitating the varying behaviour of natural fishes. They may be matched to the conditions in each case with little handling by the angler by displacement of the metal plate 6, in order to achieve the best possible catch results.

The fish-like appearance of the described imitation fish lure 1 could be enhanced, for example. by arranging bundles of threads on the swimming body 2. Depending on the direction of swimming in each case, the pectoral fins on the one hand and the tail fins on the other hand of a lure fish would be immediately by them. In this connection it should also be mentioned that the attachment of the fish hooks 9 need not necessarily take place on the metal plate 6, but can be attached otherwise as desired. Similarly, the imitation fish lure 1 may be used for towing other lures by means of appropriate construction.

It will be understood that the above description of the present invention is susceptible to various modification changes and adaptations.

What is claimed is:

1. An imitation fish lure for use with a rod and line for catching predatory fish comprising a wing shaped swimming body curved symmetrically about a transverse median line to present an outwardly curved face to one side of said swimming body and for imitating a fish swimming transversely to said line when pulled thereby, a bar parallel to a longitudinal axis of said swimming body, arranged, on said outwardly curved face of said swimming body and arranged below said longitudinal axis of said swimming body when said swimming body is pulled by said line, fastening means for slidable attachment of said line to said bar, adjusting means for adjusting said bar at right angles to said longitudinal axis of said swimming body and a stabilizing edge defined by said outwardly curved face of said swimming body covering said bar and extending to opposite extremities of said swimming body.

2. A lure as defined in claim 1, and comprising a metal plate mounted on said swimming body and let into the lower part of said outwardly curved face of said swimming body and adjustable by said adjusting means for adjusting said bar.

3. A lure as defined in claim 2, wherein said adjusting means comprises an elongate aperture defined by said metal plate and a locking screw cooperating with said elongate aperture.

4. A lure as defined in claim 2, and comprising fish hooks suspended from said metal plate.

* * * * *